(12) United States Patent
Ortiz et al.

(10) Patent No.: US 11,665,381 B2
(45) Date of Patent: May 30, 2023

(54) CONTENT MODIFICATION BASED ON ELEMENT CONTEXTUALIZATION

(71) Applicant: KYNDRYL, INC., New York, NY (US)

(72) Inventors: Jorge Andres Moros Ortiz, Melbourne (AU); Sree Harish Maathu, Coonoor (IN); Suman Sedai, Hughesdale (AU); Turgay Tyler Kay, Broadmeadows (AU)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/109,197

(22) Filed: Dec. 2, 2020

(65) Prior Publication Data

US 2022/0174339 A1    Jun. 2, 2022

(51) Int. Cl.
*H04N 21/2343* (2011.01)
*H04N 21/233* (2011.01)
*H04N 21/258* (2011.01)
*H04N 21/234* (2011.01)

(52) U.S. Cl.
CPC ..... *H04N 21/23439* (2013.01); *H04N 21/233* (2013.01); *H04N 21/23418* (2013.01); *H04N 21/25891* (2013.01)

(58) Field of Classification Search
CPC ........... H04N 21/23439; H04N 21/233; H04N 21/23418; H04N 21/25891
See application file for complete search history.

(56) References Cited

U.S. PATENT DOCUMENTS

| | | | | |
|---|---|---|---|---|
| 6,754,389 B1 * | 6/2004 | Dimitrova | ............ | G06V 40/161 |
| | | | | 348/169 |
| 7,716,232 B2 * | 5/2010 | Glenn | .................. | G11B 27/034 |
| | | | | 707/758 |
| 8,910,033 B2 * | 12/2014 | Cohen | .................. | G11B 27/036 |
| | | | | 715/202 |
| 9,471,924 B2 * | 10/2016 | Garbow | ............. | G06Q 30/0271 |
| 10,057,637 B2 | 8/2018 | Kellner | | |
| 10,607,319 B2 | 3/2020 | Vogels | | |
| 11,158,351 B1 * | 10/2021 | Ren | ........................ | G06V 10/82 |
| 2004/0049780 A1 | 3/2004 | Gee | | |
| 2009/0150947 A1 | 6/2009 | Soderstrom | | |
| 2009/0204639 A1 * | 8/2009 | Barrett | ............... | H04N 21/4425 |
| 2011/0106283 A1 | 5/2011 | Robinson | | |

(Continued)

OTHER PUBLICATIONS

Anonymous, "Customizable Age-Appropriate Filter for Video Sequences," IP.com, Disclosure No. IPCOM000252201D, Dec. 21, 2017, 4 pages. <https://priorart.ip.com/IPCOM/000252201>.

(Continued)

*Primary Examiner* — Adil Ocak
(74) *Attorney, Agent, or Firm* — Erik Swanson; Andrew M. Calderon; Calderon Safran & Cole P.C.

(57) ABSTRACT

Content of entertainment media that is being consumed by a user is analyzed. An element of the content that is of a first character is identified. A preference associated with the user to consume entertainment media that contains elements of a second character is identified. An updated version of the element is generated. The updated version of the element is of the second character, such that the media is consumed by the user with the element in the updated version.

20 Claims, 3 Drawing Sheets

(56) References Cited

U.S. PATENT DOCUMENTS

| | | | |
|---|---|---|---|
| 2011/0161999 A1* | 6/2011 | Klappert | H04N 21/4755 725/25 |
| 2014/0040931 A1 | 2/2014 | Gates, III | |
| 2015/0179220 A1* | 6/2015 | Demarty | H04N 21/84 386/282 |
| 2016/0112760 A1 | 4/2016 | Kosseifi | |
| 2018/0293712 A1 | 10/2018 | Vogels | |
| 2018/0365556 A1 | 12/2018 | Guttmann | |
| 2019/0026274 A1* | 1/2019 | Deng | H04N 21/4668 |

OTHER PUBLICATIONS

Anonymous, "Intelligent method for real-time skip over video frames based on personal viewing policy," IP.com, Disclosure No. IPCOM000235949D, Mar. 31, 2014, 3 pages. <https://priorart.ip.com/IPCOM/000235949>.

Hobson et al., "Adapting existing video file formats to enable tamper-proofing," IP.com, Disclosure No. IPCOM000011725D, Mar. 12, 2003, 5 pages. <https://priorart.ip.com/IPCOM/000011725>.

Humphreys, "GPU Accelerated Rasterization," IP.com, Disclosure No. IPCOM000239215D, Oct. 21, 2014, 7 pages. <https://priorart.ip.com/IPCOM/000239215>.

Biddle, Media Spoiler Evaluation and Mitigation, U.S. Appl. No. 16/444,098, filed Jun. 18, 2019.

Rejcek, "The New AI Tech Turning Heads in Video Manipulation," SingularityHub.com, Sep. 3, 2018, 5 pages. <https://singularityhub.com/2018/09/03/the-new-ai-tech-turning-heads-in-video-manipulation-2/>.

Singh, "Global video streaming market is largely controlled by the usual suspects," VentureBeat.com, Mar. 30, 2019, 12 pages. <https://venturebeat.com/2019/03/30/global-video-streaming-market-is-largely-controlled-by-the-usual-suspects/>.

* cited by examiner

CONTENT MODIFICATION BASED ON ELEMENT CONTEXTUALIZATION

BACKGROUND

As more and more users have subscribed to streaming services, more people are watching more forms of media on more devices than ever before. Consumers have increasing demands that media be tailored to their specific needs and desires. For example, a consumer may want to make sure that their children can watch media without being exposed to any objectionable material, such that this consumer may opt into parental controls that will block out (e.g., affirmatively not display or sound) this objectionable material for children when pre-tagged objectionable material is about to be displayed/sounded.

SUMMARY

Aspects of the present disclosure relate to a method, system, and computer program product relating to modifying content in real time based on user preferences. For example, the method includes analyzing content of entertainment media being consumed by a user. The method also includes identifying an element of the content that is of a first character. The method also includes identifying a preference associated with the user to consume entertainment media that contains elements of a second character. The method also includes generating an updated version of the element where the element is of the second character such that the media is consumed by the user with the element in the updated version. A system and computer program product that are similar to this method are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to modifying media, and more particular aspects relate to contextually modifying a character of one or more elements of entertainment media in real time based on user preferences such that the modification is undetectable to the consumer. While the present disclosure is not necessarily limited to such applications, various aspects of the disclosure may be appreciated through a discussion of various examples using this context.

Consumers are watching and listening to entertainment media at an accelerating pace, and consumers increasingly want entertainment media that is tailored specifically to their tastes and sentimentalities, showing no more and no less (and no different) than they want. Toward this end, conventional systems may be configured to detect if an upcoming portion of entertainment media has been tagged (e.g., tagged by a content provider) as containing objectionable content due to, e.g., the upcoming portion being too graphic. In response to such a detection of a pre-tagged upcoming portion, conventional systems may, e.g., skip past this objectionable material, or mute it out, or visually not display it (but rather cover the objectionable content with a black box or with pixelated graphics), or the like.

However, skipping a portion of content may be detectable to a user and/or call attention to there being objectionable content that was skipped. Further, completely skipping or blocking content may cause a user to miss other elements of the entertainment media that were not objectionable and were helpful in consuming the entertainment media (e.g., plot points or the like). Conventional systems may lack a technical ability to affirmatively take steps while providing entertainment content to a user—where these affirmatively taken steps avoid providing content that a user wishes to avoid consuming—in a way that surgically only removes the objectionable content in a way that is largely undetectable to a user.

Aspects of this disclosure are related to addressing this technical problem. For example, aspects of this disclosure (such as a computing controller described herein) are configured to modify individual elements of entertainment media content from being of a first character to instead being of a second character. The computer controller may modify these elements from an original version to this updated version based on different preferences that are specific to one or more users. A controller may modify elements of entertainment media content to make the content more suitable for a viewer, and/or to increase a consumption satisfaction of a user.

For example, aspects of this disclosure may use techniques from generative neural networks or the like to use techniques such as autoencoders, synthetic media, generative adversarial networks (GANs), etc. to generate images, audio, text, or the like to modify elements of content from a first character to a second character. Specifically, a controller may analyze entertainment media and break down the entertainment media into a plurality of elements, where each of these elements may be independently and individually modified. The controller may then use machine learning techniques as described herein to determine which elements relate to various characters of the entertainment media for which a user has a preference (e.g., such as a preference relating to extreme language, or a preference relating to graphic visual content). Once identified, the controller may modify content in real time according to these user preferences by swapping out initial elements of a first character with updated versions of these elements that are of a second character that more closely aligned with preferences of a consuming user.

Further, as would be understood by one of ordinary skill in the art, when content creators create entertainment media it can be extremely expensive and time-consuming to create the fully realized media. For example, when in post-production and the like when entertainment video is finalized, edited, etc., it may require a substantial amount of time and resources to make the entertainment media into a fully realized and polished form of content that completely provides the intended character of the entertainment media. To the extent that a content creator additionally is looking to make entertainment media that can fully satisfy the user preferences of numerous users, it may be extraordinarily cost-and-time-prohibitive to fully realize entertainment media that can do so. For example, a video game creator may attempt to create a video game that can be more or less graphic depending upon a user selecting a setting, but it may be extremely difficult for the video game creator to fully modify the entity of their entertainment media to satisfy this setting.

Aspects of the disclosure may address these concerns. For example, a content creator may create entertainment media that is designed to be modified by the computing controller described herein. In some examples, a content creator may create entertainment media that, prior to being modified by the controller, appears to be unfinished or unedited, where the content creator is intending for the controller to functionally finish the entertainment media by modifying elements as described herein. For example, a content creator may create a first version of entertainment media where there are a set of predetermined elements that are tagged to be modified, such that the entertainment media is "completed" when the controller modifies these predetermined elements in order to make the elements of a character that aligns with a preference of a user.

This may include a content creator having content in a green-screen type scene, where the controller is to fill in certain graphical or auditory "blank" portions of the entertainment media with an updated version of elements that align with user preferences using the techniques provided herein. A content creator may tag one or more of these elements that are to be modified within the entertainment media so that the controller may identify these elements and modify them accordingly. In some examples, the content creator may further identify one or more types of entertainment media that the controller is to use as "source material" in modifying the predetermined elements. For example, the content creator may tag a specific scene from a different entertainment media (e.g., from an older movie, or TV show, or video game, or the like) to use to modify a given element for to give the content a first character, and also tag a specific scene from another different entertainment media to use to modify that given element to give the content a second character, etc. By configuring the computing controller to modify elements during consumption to be of a character that aligns with a preference of the user, aspects of the disclosure may enable content creators to focus on storytelling and let the controller fully realize the specific tone to match the sentimentality of the consuming user(s).

Figure 1:
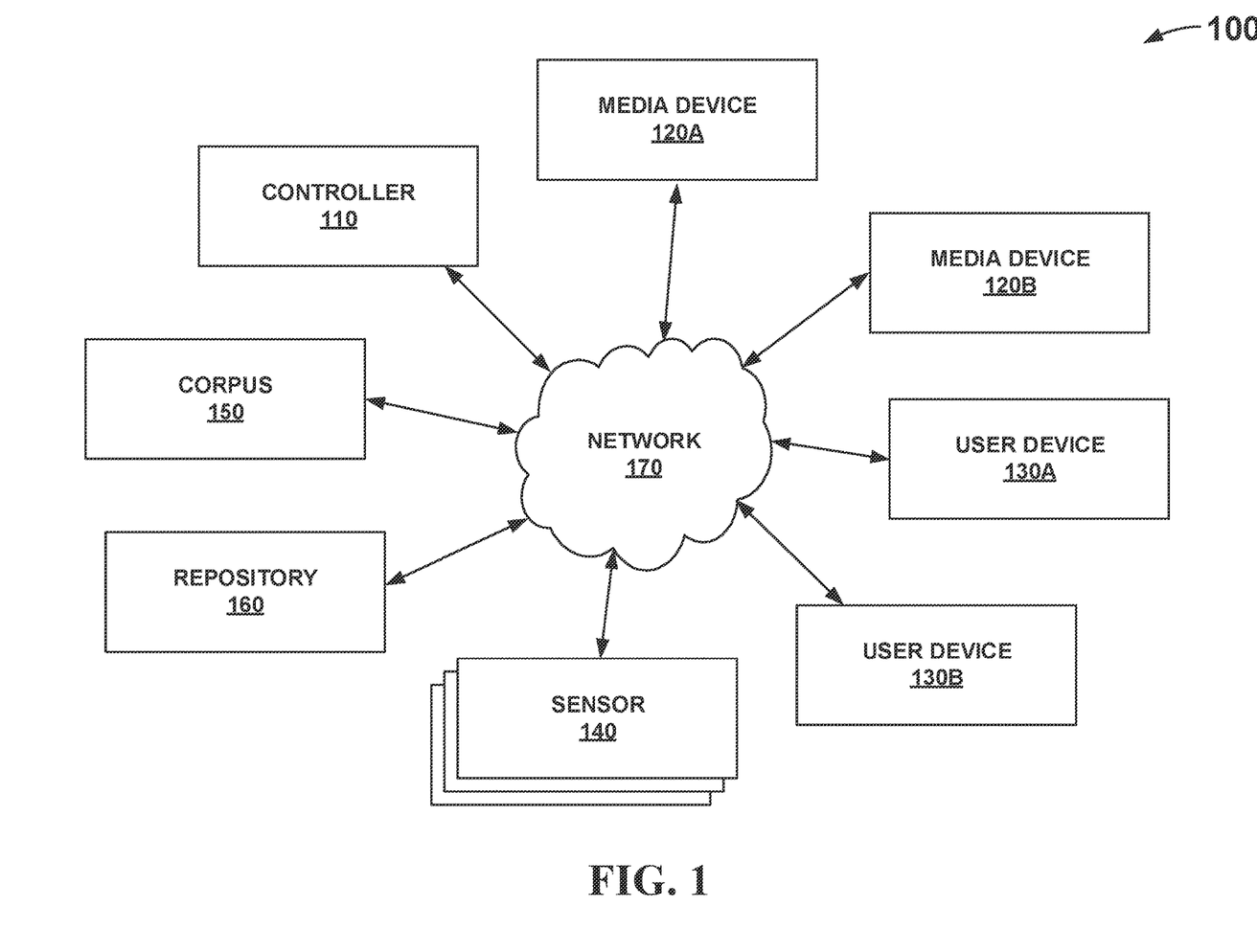
FIG. 1 depicts a conceptual diagram of an example environment in which a controller contextually modifies a character of an element within entertainment media that is viewed on a media device based on user preferences.

For example, FIG. 1 depicts system 100 that includes controller 110 that is configured to modify elements of content as it is being consumed by a user. Controller 110 may modify the content in real time as the user is consuming the entertainment media. Controller 110 may include a computing device, such as computing device 200 of FIG. 2 that includes a processor communicatively coupled to a memory that includes instructions that, when executed by the processor, cause controller 110 to execute the operations described herein. Controller 110 may monitor entertainment media as viewed using one or more media devices 120A, 120B (collectively referred to as "media devices 120"). Media devices 120 may include computing devices (similar to computing device 200 of FIG. 2 as described below) such as televisions, laptops, desktop computers, smart phones, tablets, streaming sticks, or the like. Media devices 120 may be configured to provide entertainment media to a plurality of users at once. Media devices 120 may provide the entertainment media as sent to media devices 120, as stored on a source available to media devices 120, or the like.

Controller 110 may gather and analyze visual and audible data of entertainment media. This may include tracking how individual elements move across the screen, and/or identifying which noises of entertainment media are associated with these elements. These elements may include characters, clothes, items being handled by the characters (e.g., swords, flashlights, pictures), or the like. Controller 110 may identify a group of pixels that are associated with these elements, and learn how to predict (e.g., by ingesting and identifying patterns of corpus 150 of entertainment media) how to track the element. Alternatively, or additionally, in some examples controller 110 may identify how to track an element by capturing this element in a first analysis (e.g., as the entertainment media is stored in corpus 150), such that in a subsequent viewing or showing of this entertainment media controller 110 may be able to modify the element at its (now predetermined) locations.

Controller 110 may further identify expressions of the actors/characters of the entertainment, as well as the language that is being spoken as is associated with these elements. Controller 110 may use facial analysis techniques to identify emotions of an actor, and use natural language processing (NLP) techniques as known by one of ordinary skill in the art and discussed herein to determine a character of the language being used. Controller 110 may identify how language, expressions, and elements intersect to create general semantic tones or situations that relate to these characters of the entertainment media.

Controller 110 may also correlate these tones, situations, and elements against various predetermined (or potentially generated) characters of entertainment media. As used herein, characters of entertainment media may include stylistic choices within entertainment media of which a user has preferences toward or against. For example, a user may prefer that entertainment media be more or less graphic, more or less dramatic, more or less humorous, or the like. Controller 110 may have access to these preferences (e.g., as saved in corpus 150), and may learn which elements, when associated with which provided language and/or expressions in what tones or situations, result in these characters of the entertainment media. Controller 110 may identify such associations by comparing current sets of elements of entertainment media against sets of elements within corpus 150 of entertainment media. Corpus 150 may include a massive store of entertainment media that has been analyzed (e.g., analyzed by controller 110, and/or analyzed by a neural network that operates similar to controller 110) such that individual elements are tagged and mapped to respective characters. Controller 110 may then identify that a current set of elements is similar to a set of elements from corpus 150 that is associated with a character that the user prefers to change, in response to which controller 110 modifies the current set of elements. For example, controller 110 may modify the content such that the element is changed from being of a first character to being of a second character that better matches the preferences of the user (e.g., by making graphic content into funny content, or scary content into silly content, or melodramatic content into tense content).

In some examples, a content creator could create content that is made to be thusly modified, by providing elements that are particularly easy to identify and providing media plotlines that are easy to branch in different types of character based on a preference of a user. Controller 110 may enable a content creator to quickly create content by eliminating a need to provide numerous scenes that explicitly include these different characters, as controller 110 is able to identify the elements that require modification and modify them during consumption (e.g., modify them in real time) in order for elements to be of a preferred character for a user.

Controller 110 may be configured to derive contextual understanding between interrelations of elements, actor expression, setting, music, or the like. Controller 110 may further determine in one or more ways how this contextualization of elements relates to various characters of the entertainment media (e.g., where a character of entertainment media may be a relative amount of humor, violence, scariness, drama, other graphic content, or the like). Controller 110 may analyze one or more repositories 160 of this data to identify how the usage of elements and the qualities associated with elements cause media to be of one character or another character.

Repositories 160 may include, for example, content rating systems (e.g., motion pictures association) that both quantify and qualify societal understandings of specific elements and characters of content (e.g., by saying that specific elements imbue the entertainment media with a specific character, requiring that the entertainment media be given a specific rating. In other examples, repositories 160 may include an entertainment media critic database that includes reviews of the entertainment media (e.g., from professional critics or users), where the reviews discuss how various elements results in one or more characters of various portions of the content. In other examples, controller 110 may utilize repositories 160 such as online chat boards or the like in which various users provide thoughts or commentary on entertainment media, therein discussing elements and characters of the entertainment media.

In some examples, the abilities of controller 110 may be improved over time via user feedback. For example, controller 110 may affirmatively gather (e.g., by requesting from a user) or passively gather (e.g., by tracking user actions after the user grants permission for such tracking) a user's personal idea of how elements impact characters (and how controller 110 is doing modifying content to match these preferences. In this way, controller 110 may, e.g., modify content of an audio book which has a first character of "angry" or "upsetting" and which is being consumed by a child to instead be, e.g., "indifferent" or "annoying." Controller 110 may provide this content modification for movies, television, streamed content, or the like.

Controller 110 may modify content of entertainment media that is consumed by users as provided by media devices 120. For example, controller 110 may modify content of entertainment media being streamed to media devices 120, such as where media devices 120 include a laptop that is streaming media from an online source (e.g., such as a streaming service). For another example, controller 110 may modify content of entertainment media being broadcast to media devices 120, such as where media devices 120 include a television that is being used to view a live sports broadcast (e.g., such that controller 110 may modify an element such as a graphic leg injury to instead be a relatively minor leg injury such as a turned ankle in situations where the user has indicated a preference for less graphic injuries). Alternatively, where controller 110 detects a user preference for relatively more graphic or "cartoony" content, controller 110 may modify the content to contain content of a character that might be, e.g., found in a cartoon or video game or the like. For another example, controller 110 may modify content of entertainment media being viewed from a local source such as from a DVD player or the like.

In examples where controller 110 is modifying content in a real-time broadcast which controller 110 has not previously analyzed (e.g., analyzed to identify which elements of the content make scenes of the content a certain character), controller 110 may delay the broadcast by some nominal amount (e.g., a fraction of a second, a half second, or one/two/three seconds). Controller 110 may delay the real-time broadcast an amount in which controller 110 can identify elements to be of a certain character and modify the content to include an updated version of the element of a second character such that by the time that the delayed broadcast is shown that controller 110 has modified the content. As such, by delaying the real-time broadcast of entertainment media by this nominal amount, controller 110 may be configured to modify a real-time broadcast of entertainment media as described herein.

In other examples, controller 110 may modify content of real-time broadcasts without a delay, but rather by modifying the content at a point in time that is faster than the point in time at which a human can identify what is happening. For example, controller 110 may identify a first frame of entertainment media (or from a first two or three frames, or the like) that contains an element that does not match (or is predicted to not match) a preferred character of entertainment media of a user. Then, in response to this identified current (or upcoming) element of an unpreferred character, controller 110 may modify subsequent upcoming frames of the entertainment media to match the preferred character of the user. Controller 110 may modify the upcoming frames of the entertainment media by predicting where the element that needs to be modified will be (e.g., by analyzing entertainment media of corpus 150 to identify trends of entertainment media, and matching these trends to the identified element) and modifying the entertainment media at these areas. Being as a human may lack the ability to identify content from a small amount of frames, by configuring controller 110 to modify elements to a preferred character (even after a few frames were shown of the element in an unpreferred character), controller 110 may be successful in causing a real-time broadcast (e.g., one with no delay) to be consumed by a user in functionally only the preferred character.

In certain examples, controller 110 may utilize tags that are embedded within or provided with the entertainment media to detect upcoming elements in a given character. For example, a content creator of a television show may be aware that a certain scene can thematically or stylistically go in a few different ways, for which different users may have different preferences. As such, the content creator may create the scene in a first character that is preferred by the content creator, and tag the scene as such. While a user is consuming this television show on media device 120A, controller 110 may detect this tag and identify that the upcoming character does not match a user preference. As such, controller 110 may identify how to modify the upcoming entertainment media in real-time (e.g., without a delay, or with only a nominal delay) using data of this tag, even if controller 110 has not previously analyzed this specific scene of this specific television show. For example, the content creator may have provided within these tags both physical elements and associated audible elements that contribute to a given character, including providing times and/or locations of these physical and audible elements.

In some examples, a content creator may additionally provide suggested alternative characters. For example, a tag as read by controller 110 may indicate information along the lines of "element ABC of character XYZ found in upcoming frames 123: for modifying to character UVW use element DEF, and for modifying to character RST use element GHI." In some examples, the content creator may provide specific other entertainment media (e.g., entertainment media that is in the public domain, and/or that content creator has a license to) that controller 110 may use as a source material with which to modify the content to a different character. For example, if a content creator created a scene that has a character of suspenseful but also eventful, the content creator may tag the scene as such, further identifying another similar scene from a completely separate piece of entertainment media that contains graphic elements in case a viewer prefers a graphic character, and also identifying within this tag another similar scene from another completely separate piece of entertainment media that contains humorous elements in case a viewer prefers a humorous character. By enabling a content creator to provide a specific primary source material to use in modifying elements, controller 110 may be configured to modify elements using these tags in a way that promotes the overall cohesion of the entertainment media, therein making the modification less apparent (and therein more satisfactory) to a user.

Controller 110 may learn how to visually identify and isolate the elements such that an updated version of an element can be generated to functionally replace the original element in a manner that is functionally undetectable by a user. For example, controller 110 may learn how to e.g., isolate various visual subcomponents into categories such as a background and a foreground of a scene, such that an updated version fits into the context of the scene. Controller 110 may learn to recognize and predict movement of actors and items (and therein recognize and predict associated noises), such that during the generation of updated elements only those elements that need to be changed are impacted at their original locations, leaving other elements intact such that a modification is relatively seamless.

Controller 110 may modify content of entertainment media that is being consumed by users utilizing media devices 120 over network 170. Network 170 may include a computing network over which computing messages may be sent and/or received. For example, network 170 may include the Internet, a local area network (LAN), a wide area network (WAN), a wireless network such as a wireless LAN (WLAN), or the like. Network 170 may comprise copper transmission cables, optical transmission fibers, wireless transmission, routers, firewalls, switches, gateway computers and/or edge servers. A network adapter card or network interface in each computing/processing device (e.g., controller 110, media devices 120, user devices 130, sensor 140, corpus 150, and/or repository 160) may receive messages and/or instructions from and/or through network 170 and forward the messages and/or instructions for storage or execution or the like to a respective memory or processor of the respective computing/processing device.

Though network 170 is depicted as a single entity in FIG. 1 for purposes of illustration, in other examples network 170 may include a plurality of private or public networks. For example, media devices 120 may communicate together over a private WLAN of network 170, such as a home WLAN network. Further, controller 110 may communicate with corpus 150 over a private LAN of network 170.

Additionally, controller 110 may communicate with media devices 120 over a public portion of network 170 using the Internet.

Controller 110 may identify one or more users that are consuming the entertainment media. As used herein, a user may be identified as consuming the entertainment media if a likelihood that the user is in a vicinity of respective media devices 120 that are providing the entertainment media surpasses a threshold. For example, controller 110 may identifying that media device 120A is streaming entertainment media that is associated with a profile "User 1" from a streaming service. In response to identifying this, controller 110 may determine that a user "User 1" is relatively likely to be consuming the entertainment media that is being streamed (e.g., as user "User 1" owns and predominantly uses the profile "User 1"). For another example, controller 110 may identify that media device 120A is associated with a user, such as being owned or primarily used by a user (e.g., where media device 120A is a cell phone or laptop or the like that is associated with the user "User 1"), such that entertainment media being provided by media device 120A is likely to be consumed by this user.

In some examples, controller 110 may detect that a user is in a vicinity of media device 120A that is providing entertainment media. As used herein, a user may be within a vicinity of media devices 120 providing entertainment media if the users are close enough that the user has a reasonable expectation of seeing or hearing or otherwise consuming some of the entertainment media as provided by media devices 120. For example, a user may be within a vicinity of media devices 120 that are providing entertainment media if the users are within the same room as media devices 120, or within the same building of media devices 120 (e.g., when the user walks into a home that with a TV media device 120 that is playing a movie), or within a threshold distance (e.g., 20 feet) of media device 120, or the like.

In some examples, controller 110 may detect that a user is within a vicinity of one or more media devices 120 that are providing entertainment media by detecting that one or more user devices 130A, 130B (collectively referred to as "user devices 130") are within a vicinity of the one or more media devices 120. User devices 130 may include computing devices (e.g., similar to computing device 200 of FIG. 2) that are associated with (e.g., owned or otherwise predominantly operated by) a user such as a mobile phone, smart watch, laptop, or the like. For example, controller 110 may receive location data from one or more user devices 130 (e.g., such as global position system (GPS) data or global navigation satellite system (GNSS) data) that controller 110 uses to locate the one or more user devices 130. Where media devices 120 are in a static location (e.g., a television that is within a living room), controller 110 may detect when user devices 130 are within a threshold distance of this static location, indicating that users of these user devices 130 are within a vicinity of respective media devices 120. Alternatively, or additionally, where media devices 120 are relatively mobile (e.g., where the media devices 120 include a laptop or speakers or the like), controller 110 may gather location data of both media devices 120 and user devices 130 and determine when the two are within a threshold distance of each other.

In some examples, controller 110 may identify that one or more user devices 130 are in a vicinity of media devices 120 as a result of the respective user devices 130 and media devices 120 sharing a private portion of network 170. For example, controller 110 may detect user device 130A connecting to a private WLAN portion of network 170 that is associated with media device 120A. Controller 110 may utilize data from a router or the like to determine that user device 130A is connecting to a private portion of network 170 that is associated with media device 120A. For another example, controller 110 may use near field communication (NFC) or the like to detect user device 130A being near media device 120A. For example, controller 110 may have previously identified that user device 130B as being in a vicinity of media device 120A, and may further detect, using NFC techniques, that user device 130A is within a vicinity of user device 130B (and therein within a vicinity of media device 120A).

In certain examples, controller 110 may utilize one or more sensors 140 to detect a presence of a user. Sensors 140 may include computing devices (e.g., similar to computing device 200 of FIG. 2) that are configured to gather or otherwise receive data. Sensors 140 may include computing devices of the Internet of Things (IoT), computing devices of a building automation system, computing devices of a building security system, or the like. For example, sensors 140 may include a camera that gathers an image of a user to identify that the user is in the area. For another example, sensors 140 may include a device with a microphone that gathers audio data of the user to identify that the user is in the area (e.g., as a result of this user speaking an auditory command to sensor 140). For another example, sensors 140 may include one or more smart appliances that have settings that are specified for the user (e.g., a coffee machine that makes a coffee in a particular way for the user, or speakers that play particular music for the user, or lights that set up a particular lighting for the user, or a garage door opener that detects an incoming car of the user to open a garage door for the user, and controller 110 may determine that the user is in the vicinity of sensors 140 as a result of sensors 140 automating the smart appliances in a manner that is consistent with the user. In this way, using facial recognition or voice recognition or IoT data or the like, controller 110 may use sensors 140 to determine some or all users that are in the vicinity.

As mentioned above, controller 110 may modify content of entertainment media. Controller 110 may learn some preferences of a user by identifying what varieties of entertainment media this user is consuming. For example, controller 110 may keep a record of some, most, or substantially all entertainment media that has been consumed by a user (e.g., played by one or more media devices 120 when the user was in the vicinity of the media devices 120 as detected above). Controller 110 may store this data in corpus 150, which may be a computing device as described herein. For example, corpus 150 may include a server or a rack of servers or a laptop or a desktop or the like. Controller 110 may access corpus 150 over network. Though corpus 150 is depicted as a separate device from controller 110 for the sake of illustration, in other examples corpus 150 may be functionally integrated into controller 110.

Controller 110 may receive an opt-in from one or all of users and/or user devices 130 prior to gathering and/or receiving entertainment media consumption data. For example, one or many or each of user devices 130 may affirmatively go to a software application associated with controller 110 in order to authorize controller 110 to gather and/or receive some or all of the data described herein. In some examples, a single user device 130A that has administrative privileges over many or substantially all user devices 130 (e.g., a device that is associated with a legal guardian over the users of other devices) may authorize controller 110 to gather and/or receive data from many or all other user devices 130.

In some examples, controller 110 may provide computing agents that are housed on media devices 120, user devices 130, and/or sensors 140 to forward data as described herein (e.g., entertainment media consumption data, location data, facial recognition data, voice recognition data, IoT data, or the like) to controller 110. These computing agents may be configured to substantially only forward along such data that meet the criteria of data in corpus 150, which is to say data that relates to modifying content of entertainment media. Alternatively, or additionally, controller 110 may itself gather or collect data that is sent to and/or between media devices 120, user devices 130, and/or sensors 140 as this data is transmitted over network 170 (e.g., by evaluating messages that traverse a firewall of network 170).

As described above, controller 110 may identify how characteristics of elements impact a character of the entertainment media by crawling through online repositories 160 (e.g., online forums or reviews or film databases or the like) on network 170. For example, controller 110 may identify online repositories 160 that include forums that relate to a specific body of entertainment media (e.g., a specific television show, film franchise, or the like), and identify that a specific portion of the forum is flagged or tagged or discussed as related to a specific element that made a scene of a specific character (e.g., how a "monster" element made a scene more scary or less scary, or how a "tax discussion" element made a scene more boring or less boring, or how an "injury" element made a scene more graphic or less graphic, or the like). Controller 110 may execute natural language processing (NLP) techniques as discussed herein to identify the specific interrelations between elements and characters.

In one example, controller 110 may detect that the content relates to a scene in which an actor does or says something which creates a character such as tense, anger, and/or violence. Controller 110 may determine that a user who is watching the entertainment media of such scenes has a preference of "no violence" associated with the user and that the user is associated with a preference of "humor." As such, in some embodiments, controller 110 determines to remove those elements that are associated with the character that is not preferred, and generates updated version of these elements associated with the character that is preferred.

Controller 110 may be configured to change only the number of elements that are required to change the character of the entertainment media from "violent" to "funny." For example, controller 110 may determine that some audible elements may remain unmodified while still having the entertainment media be in a character of "funny," such that controller 110 does not modify all audible elements in a given scene.

Figure 2:
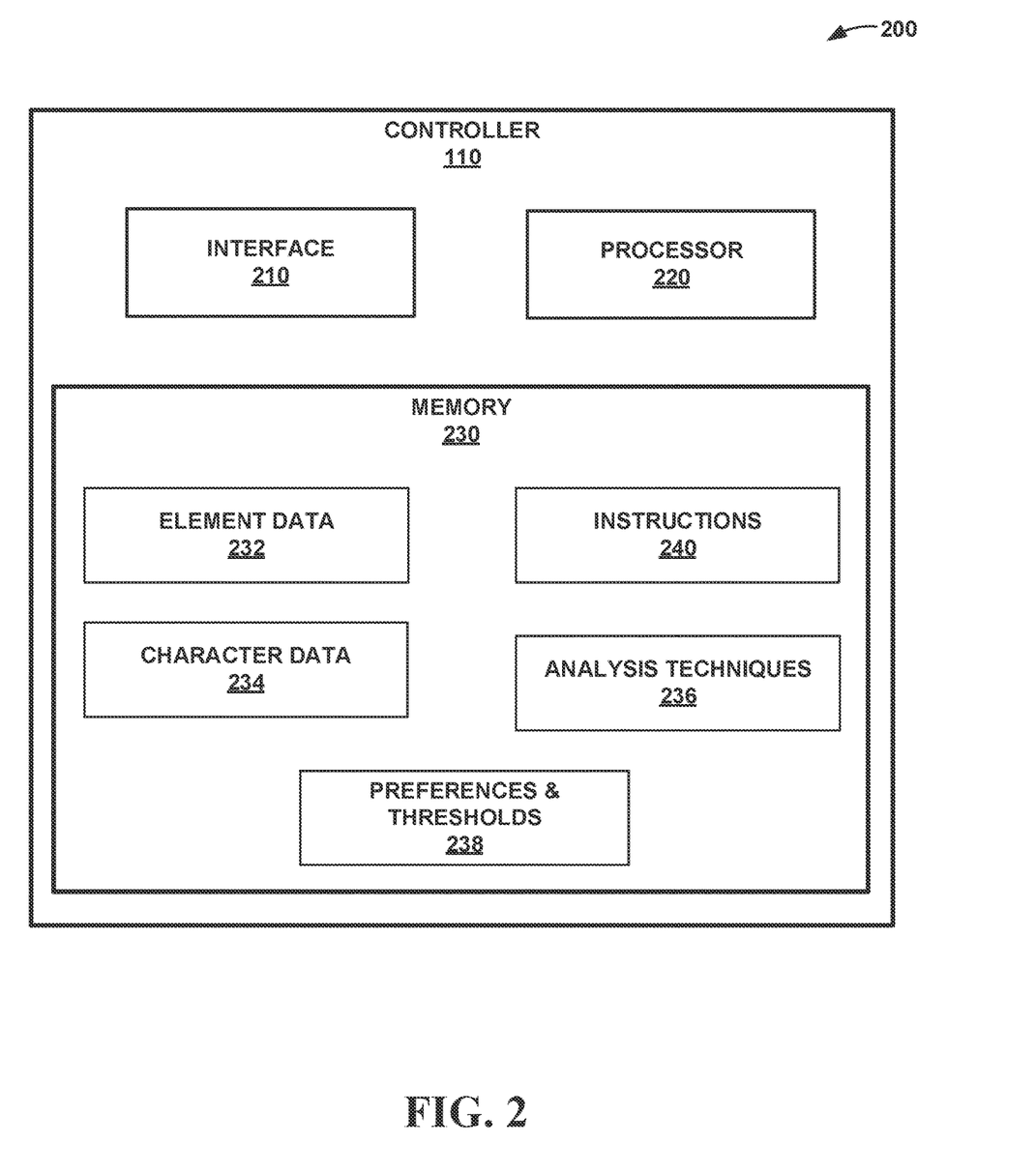
FIG. 2 depicts a conceptual box diagram of a computing system that may be configured to modify content based on user preferences.

As described above, controller 110 may include computing device 200 with a processor configured to execute instructions stored on a memory to execute the techniques described herein. For example, FIG. 2 is a conceptual box diagram of such computing device 200 of controller 110. While controller 110 is depicted as a single entity (e.g., within a single housing) for the purposes of illustration, in other example controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) and/or to communicate with entities external to controller 110. Specifically, interface 210 may be configured to enable components of controller 110 to communicate with media devices 120, user devices 130, sensor(s) 140, corpus 150, repositories 160, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to modify content of entertainment media. Controller 110 may utilize processor 220 to modify content of entertainment media. Processor 220 may include, for example, microprocessors, digital signal processors (DSPs), application specific integrated circuits (ASICs), field-programmable gate arrays (FPGAs), and/or equivalent discrete or integrated logic circuit. Two or more of processor 220 may be configured to work together to modify content of entertainment media.

Processor 220 may modify content of entertainment media according to instructions 240 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may modify content of entertainment media according to instructions 240 of one or more applications (e.g., software applications) stored in memory 230 of controller 110.

In addition to instructions 240, in some examples gathered or predetermined data or techniques or the like as used by processor 220 to modify content of entertainment media may be stored within memory 230. For example, memory 230 may include information described above that may be stored in corpus 150, and/or may include substantially all of corpus 150. As depicted in FIG. 2, memory 230 may include element data 232 and character data 234. Element data 232 may include data on graphical or audible portions of entertainment data that are related, such as an actor, an expression, a physical item, a sound effect, spoken words, or the like. Character data 234 may include data that specifies how these elements contribute together to change a character of entertainment media, such as making entertainment media relatively funny, scary, dramatic, or the like. As stored in memory 230, element data 232 and character data 234 may be interrelated, where adding in new element data 232 may impact character data 234, and vice versa.

Memory 230 may include analysis techniques 236 that controller 110 may use to recognize and analyze elements and characters of entertainment media and/or user data as gathered from media devices 120, user devices 130, sensors 140, and/or repositories 160 over network 170. For example, analysis techniques 236 may include such data analyzing techniques as NLP techniques, image recognition techniques, speech-to-text techniques, or the like. NLP techniques can include, but are not limited to, semantic similarity, syntactic analysis, and ontological matching. For example, in some embodiments, processor 220 may be configured to parse comments from online forums in repositories 160 related to entertainment media played on media devices 120 to determine semantic features (e.g., word meanings, repeated words, keywords, etc.) and/or syntactic features (e.g., word structure, location of semantic features in headings, title, etc.) of the online forums. Ontological matching could be used to map semantic and/or syntactic features to a particular concept. The concept can then be used to determine the subject matter. In this way, using NLP techniques, controller 110 may, e.g., identify an online forum as discussing a character of an element, and therein gather element data 232 and/or character data 234 for a given portion of entertainment media from these forums.

Similarly, analysis techniques 236 may include image recognition techniques such as optical character recognition (OCR) for identifying text, or general shape identification and/or recognition techniques, or object tracking techniques where images are received as a stream of images (e.g., as part of a video feed) to identify if a user is in a vicinity as described herein. Controller 110 may use these analysis techniques 236 to analyze image data of entertainment media to identify element data 232, to identify that a user is in a vicinity using data from sensors 140, or the like. For example, controller 110 may identify a humanoid shape from entertainment media as matching an online profile of a fictional person from entertainment media to identify an element related to that fictional person. Further, analysis techniques 236 may include speech-to-text techniques that may be used by controller 110 to identify the text of speech of the entertainment media to further identify elements and characters of the content that controller 110 may modify.

Further, memory 230 can include preferences and thresholds 238, which may include preferences of characters for some or all users for which controller 110 may modify content. In some examples, preferences and thresholds 238 may also include a general profile of each user, such as profiles that provide sufficient information to identify each user through data gathered over network 170. For example, preferences and thresholds 238 may include a voice profile and facial recognition pattern and the like for one or more users, such that controller 110 may use preferences and thresholds 238 to identify these users when they communicate over network 170 (e.g., using a web conference). Preferences and thresholds 238 may also include a set of media devices 120 that are associated with each user (e.g., such as a television or speaker), a set of user devices 130 that are associated with each user (e.g., such as a laptop and a cell phone of the user) and/or a set of usernames or online identifiers for each user (e.g., an email or specific subscription identifier for a streaming service) to use to track entertainment media consumed by each user. Preferences and thresholds 238 may also include data on when and how users of user data 236 would like controller 110 to modify elements. For example, preferences and thresholds 238 may include data on what character of entertainment media a user prefers, and when a user prefers that the entertainment media be modified. For example, preferences and thresholds 238 may indicate how severe a character and/or element has to be prior to controller 110 modifies content as described herein. Preferences and thresholds 238 may indicate that the users would prefer controller 110 to modify content for substantially all entertainment media of a first character, or to avoid modifying content for climactic moments, or the like.

Figure 3:
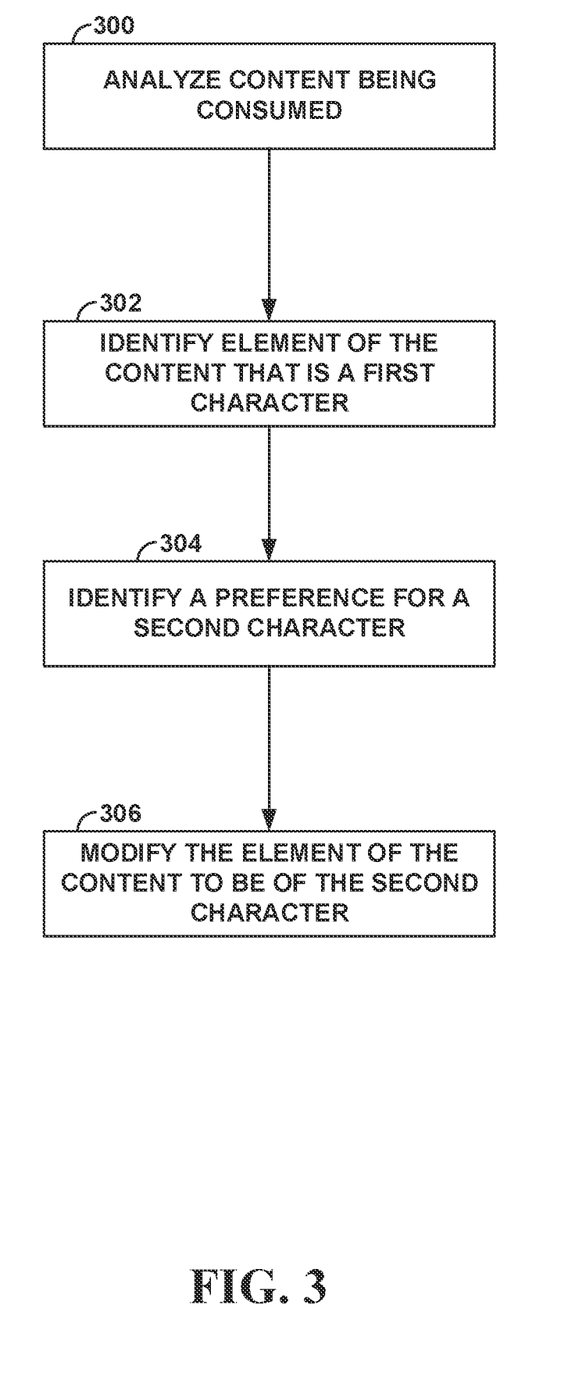
FIG. 3 depicts an example flowchart of contextually modifying elements of entertainment media based on user preferences.

Controller 110 may modify content of entertainment media according to many techniques. For example, controller 110 may modify content of entertainment media according to the flowchart depicted in FIG. 3. The flowchart of FIG. 3 is discussed with relation to FIG. 1 for purposes of illustration, though it is to be understood that other systems may be used to execute the flowchart of FIG. 3 in other examples. Further, in some examples system 100 may execute a different method than the flowchart of FIG. 3, or system 100 may execute a similar method with more or less steps in a different order, or the like.

Controller 110 analyzes content of entertainment media being consumed by a user (300). The user may consume the media via media device 120. Controller 110 may be comparing the media data that is currently being consumed and/or that is about to be consumed by the user (e.g., where there is a time delay, and/or where the entertainment media is recorded).

Controller 110 identifies an element of the content that is of a first character (302). For example, controller 110 may identify an element such as an object, an outfit, a character, or the like. Controller 110 may identify all things that relate to this element within the entertainment media, such that modifying the element includes modifying all of these things.

In some examples, controller 110 may identify that the element is in a first character by identifying metadata of the entertainment media of that first character. This metadata may be embedded within the entertainment media itself, and/or the metadata may be stored in corpus 150 (e.g., where controller 110 previously analyzed the given entertainment media and then created this metadata. In other examples, controller 110 may identify that the element of the content is in the first character by crawling across publicly available data repositories that indicate that the element is of the first character.

Controller 110 identifies a preference associated with the user to consume entertainment media that contains elements of a second character (304). This preference may include a character that is more graphic or less graphic. A character may include a magnitude or severity of humor, violence, drama, or the like. In some examples, controller 110 may additionally or alternatively identify a preference that is associated with a specific media device 120 and/or a specific time or day of the week. For example, controller 110 may identify that a tablet media device 120A is associated with a preference for relatively less graphic content at all times, while a television media device 120B is associated with a preference for relatively less graphic content on Saturday mornings and weekdays from 5:00 pm until 9:00 pm, and is associated with a preference for relatively more graphic content after 9:00 pm on weekdays, etc.

Controller 110 generates an updated version of the element where the updated element is in the second character, such that the media is consumed by the user with the updated element in the second character (306). Controller 110 may utilize autoencoders or the like to generate the updated version of the element. Controller 110 may modify the content by changing the graphical presentation of the entertainment media. For example, controller 110 may modify a sword to be a stick, or modify a phrase or tone identified by the user as undesired to be a phrase, word, tone, or the like that the user has identified as acceptable or preferred. Controller 110 may modify an element such that it becomes less graphic (e.g., from a sword to a foam stick), and/or controller 110 may modify the entertainment media such that it becomes more graphic (e.g., from a foam stick to a sword) according to the user preferences. Controller 110 may modify the entertainment media in such a way that it is difficult or impossible for a user to identify what was modified.

Controller 110 may generate the updated version of the element by modifying how the element is visually provided to the user. For example, controller may graphically track the element of the first character as the element of the first character moves within the content. Tracking the element may include predicting where the element will go (e.g., where controller 110 has not previously analyzed the respective entertainment media) or recalling where the element will go (e.g., where the controller 110 has previously analyzed the respective entertainment media). Controller 110 may then graphically generate the updated version of the element over the element of the first character as the element of the first character moves within the content.

Alternatively, or additionally, controller 110 may generate the updated version of the element by modifying how the element is audibly provided to the user. For example, controller 110 may audibly isolate one or more sounds associated with the element of the first character. This might include identifying and isolating spoken lines, sounds effects, or the like. Controller 110 may then generate the updated version by dubbing updated sounds of the element in the second character over the one or more sounds of the element in the first character.

In certain examples, controller 110 may execute the steps of FIG. 3 in real-time without any available data or metadata on the entertainment media currently being consumed by a user. For example, controller 110 may have learned to identify that the element is in the first character (302) by analyzing corpus 150 of entertainment media. For example, corpus 150 of entertainment media may include a first plurality of elements that are of a first character and a second plurality of elements that are of a second character. Controller 110 may identify a previously learned (e.g., using a neural network or the like as described herein) first set of rules that govern how the first plurality of elements move and sound. Once controller 110 identifies the preference for the second character (304), controller 110 may identify a previously learned (e.g., using a neural network) second set of rules that govern relationships between the second plurality of elements and the second character. At this point, controller 110 may generate the updated version of the element (306) by using the first set of rules to remove traces of the element in the first character and simultaneously using the second set of rules to provide the element in the second character.

It is to be understood that a user utilizing the functionality provided by the embodiments described herein should be mindful of applicable copyright issues such that another entity's copyright in the displayed media (including updated versions of elements) is not violated through use of embodiments of the system and method described herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   analyzing content of a video feed of entertainment media being consumed by a user;
   identifying an element of the content that is of a first character in a plurality of frames of the video feed of the entertainment media;
   identifying a preference associated with the user to consume entertainment media that contains elements of a second character, wherein the first character and the second character are different stylistic choices within the entertainment media;
   predicting, based on a plurality of video feeds from a plurality of entertainment media and a machine learning model, where the element of the content that is of the first character will be in a plurality of locations in a plurality of upcoming frames of the entertainment media; and
   generating, using the prediction, an updated version of the element at the plurality of locations, wherein the updated version of the element is of the second character such that the media is consumed by the user with the updated version of the element.

2. The computer-implemented method of claim 1, wherein the first character relates to relatively more graphic content and the second character relates to relatively less graphic content, and the first character and the second character are identified from a corpus of analyzed entertainment media.

3. The computer-implemented method of claim 1, wherein:
   the element of the content that is of a first character is an original version of the entertainment media;
   the first character relates to a first stylistic choice of being relatively less graphic content, and
   the second character relates to a second stylistic choice of being relatively more graphic content, such that generating the updated version of the element modifies the original version of the entertainment media to be relatively more graphic.

4. The computer-implemented method of claim 1, wherein generating the updated version of the element includes:
   analyzing the entertainment media to learn how to visually identify and isolate the element for independent and individual modification; and
   modifying how the element is visually provided to the user in real time by swapping out initial elements of a first character with updated versions of the initial elements that are of a second character in a manner that is functionally undetectable by the user.

5. The computer-implemented method of claim 4, further comprising graphically tracking the element of the first character as the element of the first character moves within the content,
   wherein modifying how the element is visually provided includes graphically generating the updated version of the element over the element of the first character as the element of the first character moves within the content.

6. The computer-implemented method of claim 1, wherein generating the updated version of the element includes:
   analyzing the entertainment media to learn how to audibly identify and isolate one or more sounds of the element for independent and individual modification; and
   modifying how the element is audibly provided to the user in real time.

7. The computer-implemented method of claim 6, further comprising audibly isolating one or more sounds associated with the element of the first character,
   wherein modifying how the element is audibly provided includes dubbing updated sounds of the element in the second character over the one or more sounds.

8. The computer-implemented method of claim 1, further comprising:
   analyzing a corpus of entertainment media that includes a first plurality of elements of the first character and a second plurality of elements of the second character;
   identifying a first set of rules that govern how the first plurality of elements move and sound, and
   identifying a second set of rules that govern relationships between the second plurality of elements and the second character,
   wherein generating the updated version of the element includes using the first set of rules to remove traces of the element in the first character and using the second set of rules to provide the updated version of the element in the second character.

9. The computer-implemented method of claim 1, wherein identifying the element of the content that is of the first character includes identifying metadata of the entertainment media of that is of the first character.

10. The computer-implemented method of claim 1, wherein identifying the element of the content that is of the first character includes crawling across publicly available data repositories to identify that the element is of the first character.

11. A system comprising:
    a processor; and
    a memory in communication with the processor, the memory containing instructions that, when executed by the processor, cause the processor to:
    analyze content of a video feed of entertainment media being consumed by a user;
    identify an element of the content that is of a first character in a plurality of frames of the video feed of the entertainment media;
    identify a preference associated with the user to consume entertainment media that contains elements of a second character, wherein the first character and the second character are different stylistic choices within the entertainment media;
    predict, based on a plurality of video feeds from a plurality of entertainment media and a machine learning model, where the element of the content that is of the first character will be in a plurality of locations in a plurality of upcoming frames of the entertainment media; and
    generate, using the prediction, an updated version of the element at the plurality of locations, wherein the updated version of the element is of the second character such that the media is consumed by the user with the updated version of the element.

12. The system of claim 11, the memory containing additional instructions that, when executed by the processor, cause the processor to:
    graphically track the element of the first character as the element of the first character moves within the content,
    wherein generating the updated version of the element includes modifying how the element is visually provided to the user in real time, and
    wherein modifying how the element is visually provided includes graphically generating the updated version of the element over the element of the first character as the element of the first character moves within the content in a manner that is functionally undetectable by the user.

13. The system of claim 11, the memory containing additional instructions that, when executed by the processor, cause the processor to:
audibly isolate one or more sounds associated with the element of the first character,
wherein generating the updated version of the element includes modifying how the element is audibly provided to the user in real time, and
wherein modifying how the element is audibly provided includes dubbing updated sounds of the element in the second character over the one or more sounds in a manner that is functionally undetectable by the user.

14. The system of claim 11, wherein the first character relates to relatively more graphic content and the second character relates to relatively less graphic content, and the first character and the second character are identified from a corpus of analyzed entertainment media.

15. The system of claim 11, the memory containing additional instructions that, when executed by the processor, cause the processor to:
analyze a corpus of entertainment media that includes a first plurality of elements of the first character and a second plurality of elements of the second character;
identify a first set of rules that govern how the first plurality of elements move and sound; and
identify a second set of rules that govern relationships between the second plurality of elements and the second character,
wherein generating the updated version of the element includes using the first set of rules to remove traces of the element in the first character and using the second set of rules to provide the updated version of the element in the second character.

16. A computer program product, the computer program product comprising a computer readable storage medium having program instructions embodied therewith, the program instructions executable by a computer to cause the computer to:
analyze content of a video feed of entertainment media being consumed by a user;
identify an element of the content that is of a first character in a plurality of frames of the video feed of the entertainment media;
identify a preference associated with the user to consume entertainment media that contains elements of a second character, wherein the first character and the second character are different stylistic choices within the entertainment media;
predict, based on a plurality of video feeds from a plurality of entertainment media and a machine learning model, where the element of the content that is of the first character will be in a plurality of locations in a plurality of upcoming frames of the video feed of the entertainment media; and
generate, using the prediction, an updated version of the element at the plurality of locations, wherein the updated version of the element is of the second character such that the media is consumed by the user with the updated version of the element.

17. The computer program product of claim 16, the computer readable storage medium having additional program instructions embodied therewith that are executable by the computer to cause the computer to:
graphically track the element of the first character as the element of the first character moves within the content,
wherein generating the updated version of the element includes modifying how the element is visually provided to the user in real time, and
wherein modifying how the element is visually provided includes graphically generating the updated version of the element over the element of the first character as the element of the first character moves within the content in a manner that is functionally undetectable by the user.

18. The computer program product of claim 16, the computer readable storage medium having additional program instructions embodied therewith that are executable by the computer to cause the computer to:
audibly isolate one or more sounds associated with the element of the first character,
wherein generating the updated version of the element includes modifying how the element is audibly provided to the user in real time, and
wherein modifying how the element is audibly provided includes dubbing updated sounds of the element in the second character over the one or more sounds.

19. The computer program product of claim 16, wherein the first character relates to relatively more graphic content and the second character relates to relatively less graphic content and the first character and the second character are identified from a corpus of analyzed entertainment media.

20. The computer program product of claim 16, the computer readable storage medium having additional program instructions embodied therewith that are executable by the computer to cause the computer to:
analyze a corpus of entertainment media that includes a first plurality of elements of the first character and a second plurality of elements of the second character;
identify a first set of rules that govern how the first plurality of elements move and sound; and
identify a second set of rules that govern relationships between the second plurality of elements and the second character,
wherein generating the updated version of the element includes using the first set of rules to remove traces of the element in the first character and using the second set of rules to provide the updated version of the element in the second character.

* * * * *